(12) United States Patent
Bumiller et al.

(10) Patent No.: US 10,298,294 B2
(45) Date of Patent: May 21, 2019

(54) METHOD AND SYSTEM FOR THE ENERGY-OPTIMIZED TRANSMISSION OF DATA IN A WIRED MULTICARRIER MODULATION (MCM) TRANSMISSION SYSTEM

(71) Applicant: HOCHSCHULE RUHR WEST, Mülheim an der Ruhr (DE)

(72) Inventors: Gerd Bumiller, Bottrop (DE); George Hallak, Essen (DE)

(73) Assignee: HOCHSCHULE RUHR WEST, Mülheim an der Ruhr (DE)

( * ) Notice: Subject to any disclaimer, the term of this patent is extended or adjusted under 35 U.S.C. 154(b) by 182 days.

(21) Appl. No.: 15/125,919

(22) PCT Filed: Mar. 5, 2015

(86) PCT No.: PCT/EP2015/054564
§ 371 (c)(1),
(2) Date: Sep. 13, 2016

(87) PCT Pub. No.: WO2015/135819
PCT Pub. Date: Sep. 17, 2015

(65) Prior Publication Data
US 2017/0005702 A1    Jan. 5, 2017

(30) Foreign Application Priority Data

Mar. 13, 2014   (DE) .................... 10 2014 204 673

(51) Int. Cl.
*H04L 5/00*  (2006.01)
*H04B 3/54*  (2006.01)

(52) U.S. Cl.
CPC ........... *H04B 3/544* (2013.01); *H04L 5/0007* (2013.01); *H04L 5/0044* (2013.01)

(58) Field of Classification Search
CPC ... H04L 5/0007; H04L 5/0044; H04L 41/046; H04B 3/544
(Continued)

(56) References Cited

U.S. PATENT DOCUMENTS 5,717,716 A * 2/1998 Doyle ................. H04L 25/0268
375/232
5,757,265 A * 5/1998 Kogure ............. H04L 12/40006
324/539
(Continued)

FOREIGN PATENT DOCUMENTS

DE   199 40 544       3/2001
DE   100 50 476 B4    3/2005
(Continued)

OTHER PUBLICATIONS

International Search Report and Written Opinion of PCT/EP2015/054564, dated Mar. 5, 2015.

*Primary Examiner* — Emmanuel Bayard
(74) *Attorney, Agent, or Firm* — Westman, Champlin & Koehler, P.A.

(57) ABSTRACT

In a method for an optimized transmission of data in a wired multi-carrier (multi-carrier modulation—MCM) transmission system from a transmitter to one or more receivers via a transmission channel, only one specified supply power is provided for the transmitter, a transmitted signal for transmitting data has a plurality of subcarriers, and the data together with redundant information is distributed to the plurality of subcarriers in such a way that the receiver can dispense with some of the subcarriers in order to determine the data. The method includes a step of determining frequency-dependent access impedances of the wired transmission channel on the transmitter, and a step of adjusting the signal amplitude of the individual subcarriers on the basis of (Continued)

the measured frequency-dependent access impedances sand the limited supply power.

17 Claims, 3 Drawing Sheets

(58) Field of Classification Search
USPC .......................................... 375/25–260, 315
See application file for complete search history.

(56) References Cited

U.S. PATENT DOCUMENTS

| | | | | |
|---|---|---|---|---|
| 6,177,801 | B1 * | 1/2001 | Chong | G01R 31/024 |
| | | | | 324/520 |
| 6,993,315 | B1 * | 1/2006 | Frazier | B82Y 10/00 |
| | | | | 332/138 |
| 7,684,502 | B2 * | 3/2010 | Kurobe | H04L 1/0003 |
| | | | | 370/204 |
| 7,796,368 | B2 * | 9/2010 | Kotani | H01J 37/32174 |
| | | | | 361/82 |
| 8,270,505 | B2 * | 9/2012 | Stadelmeier | H04B 3/542 |
| | | | | 375/147 |
| 2003/0142815 | A1 * | 7/2003 | Nordin | H04M 3/007 |
| | | | | 379/399.01 |
| 2003/0156014 | A1 * | 8/2003 | Kodama | H04B 3/54 |
| | | | | 375/258 |
| 2009/0307540 | A1 * | 12/2009 | Razazian | H04B 3/143 |
| | | | | 714/701 |
| 2010/0316140 | A1 * | 12/2010 | Razazian | H04B 3/54 |
| | | | | 375/257 |
| 2011/0058594 | A1 * | 3/2011 | Koyama | H04B 3/544 |
| | | | | 375/222 |
| 2014/0248844 | A1 * | 9/2014 | Langer | H04B 1/0458 |
| | | | | 455/127.2 |

FOREIGN PATENT DOCUMENTS

| | | |
|---|---|---|
| DE | 60 2004 006 817 T2 | 1/2008 |
| EP | 1850501 | 10/2007 |
| WO | 2008130892 | 10/2008 |
| WO | 2015135819 | 9/2015 |

* cited by examiner

METHOD AND SYSTEM FOR THE ENERGY-OPTIMIZED TRANSMISSION OF DATA IN A WIRED MULTICARRIER MODULATION (MCM) TRANSMISSION SYSTEM

CROSS-REFERENCE TO RELATED APPLICATION

This application is a Section 371 National Stage Application of International patent application Serial No. PCT/EP2015/054564, filed Mar. 5, 2015, and published as WO 2015/135819, in German, on Sep. 17, 2015, and claims priority to German patent application Serial No. 10 2014 204 673.4, filed Mar. 13, 2014. The contents of each of the above-identified applications are hereby incorporated by reference in their entirety.

BACKGROUND

In many areas of technology, transmission systems for exchanging the most varied data are used. As a rule here, the transmission channel is not constant, but has varying characteristics. One area of these data transmission systems is that of wired transmission systems.

Without loss of generality, these data transmission systems include for example Digital Subscriber Line (DSL) systems as well as Power Line Communication (PLC) systems.

However, there is an increasing demand for energy-optimised systems. The previous systems and methods have however only allowed insufficient results to be achieved.

SUMMARY

Some embodiments of the invention include a method and a system for the energy-optimised transmission of data in a wired transmission system, in particular a Multi-Carrier Modulation (MCM) transmission system.

In some embodiments of a method for an optimised transmission of data in a wired multi-carrier (multi-carrier modulation—MCM) transmission system from a transmitter to one or more receivers via a transmission channel, only one specified supply power is provided for the transmitter, a transmitted signal for transmitting data has a plurality of subcarriers, and the data together with redundant information is distributed to the plurality of subcarriers in such a way that the receiver can dispense with some of the subcarriers in order to determine the data. Some embodiments of the method include a step of determining frequency-dependent access impedances of the wired transmission channel on the transmitter, and a step of adjusting the signal amplitude of the individual subcarriers on the basis of the measured frequency-dependent access impedances and the limited supply power.

Some embodiments are directed to a system for the optimised transmission of data in a wired multi-carrier (multi-carrier modulation—MCM) transmission system from a transmitter to one or more receivers via a transmission channel. In some embodiments, the system comprises a transmission unit for transmitting a signal, wherein only one specified supply power is provided for the transmitter, the transmitted signal has a plurality of subcarriers for the transmission of data, and the data together with redundant information is distributed to the plurality of subcarriers in such a way that the receiver can dispense with some of the subcarriers in order to determine the data. The system includes a measurement unit for determining frequency-dependent access impedances of the wired transmission system on the transmission unit, and a control unit for adjusting the signal amplitude of the individual subcarriers on the basis of the measured frequency-dependent access impedances and the limited supply power.

BRIEF DESCRIPTION OF THE DRAWINGS

Embodiments of the invention will be described in more detail below with reference to the attached figures, wherein.

DETAILED DESCRIPTION OF ILLUSTRATIVE EMBODIMENTS

Embodiments of the invention will be described below with reference to Power Line Communication (PLC), in particular with reference to future Smart Grid applications. However, the considerations can readily be applied also to other wired systems as well as to other applications.

To start with it has to be noted that there is an increasing demand for PLC systems. The reason for this is, inter alia, that the transmission paths and connections are as a rule already present and can now also be used for a further purpose. In this connection, the lower frequency ranges, i.e. below approx. 600 kHz, are preferably used below 525 kHz. However, the transmission paths used in this way, as well as connections, have as a rule not been designed for use as a data transmission system. Moreover, the characteristics vary over time. Also the type and the proportion of different interferences constitute a problem.

Another problem, which so far has not been solved, is the frequency-dependent impedance that results, inter alia, from a misadaptation of the output impedance of the transmitter modem and of the varying access impedance of the transmission medium. Further it has to be noted that the time-dependent coupling impedance, even if it is adapted, leads to non-linear distortions of the channel. In this connection, MCM System inter-carrier interference develops.

Reference will be made below to so-called multi-carrier modulation systems (MCM). One implementation of such systems is Orthogonal Frequency Division Modulation (OFDM) systems.

In this respect, reference will be made below only to OFDM systems because these systems provide particularly high bandwidth efficiency and can moreover utilise the available frequency range very well. Due to the physical characteristics of the OFDM system, i.e. that the subcarriers are orthogonal to each other, in principle any subcarrier can be controlled separately. This separate, independent control includes the transmitted power. In this context, the channel capacity is the maximum amount of information that can be securely transported over a transmission channel. Insofar, the channel capacity constitutes an important factor in the evaluation of the performance ability of such transmission systems. However, conventional systems do not utilise this characteristic, as will be explained in more detail below.

In PLC systems, a great variation of the transmission channel can be noted. In this context, a number of different factors play a part. On the one hand, the transmission channel changes as a result of switching operations, so that the transmission channel is influenced by switching individual line branches on or off. On the other hand, the increasing number of switched-mode power supplies and other non-ohmic consumers has a strong effect on interferences on the transmission channel as well as on the access impedance.

Figure 5:
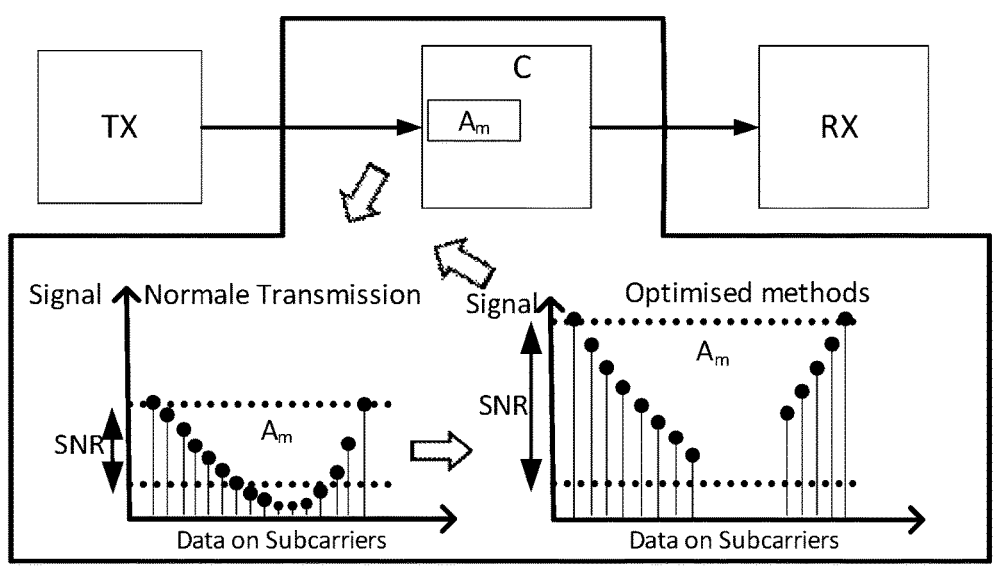
FIG. 5 shows an example of a comparison between a transmission method according to the prior art and according to an embodiment of the invention by the example of the channel model or the sequence of an embodiment of the invention.

So far, energy optimisation has been carried out only in so far as the current of the transmission signal was measured which, in typical amplifier structures, is proportional to the consumed power of the transmission amplifier. If this current, or the consumed power, exceeds a threshold, the complete transmission signal, i.e. all the subcarriers, is scaled so as to limit the consumed power. The spectral shaping of the signal is not changed here. This case is shown on the left-hand side of FIG. 5 in respect of the normal transmission of data of a transmitter TX to a receiver RX via a channel by means of a plurality of subcarriers. It is shown here that only a limited signal to noise ratio (SNR) can be achieved.

The inventors have now recognised that only a small proportion of the subcarriers is responsible for the high current because the access impedance of the channel assumes different values for different frequencies. Scaling of the other subcarriers for adhering to the power/current limit is not necessary, on the contrary, the scaling of the subcarriers for the transmission is even deleterious. This can be seen on the left-hand side of FIG. 5 by the fact that some subcarriers even get lost in the noise.

In order to understand this relation, first of all the transmission model will be explained in more detail.

In practice, the connection of a transmitter to an access point to the transmission network and the connection of a receiver to another access point to the transmission network by means of respective connection circuits constitute a transmission channel and the characterisation of the transmission channel can be realised by carrying out measurements in respect of these two connection points.

Figure 1:
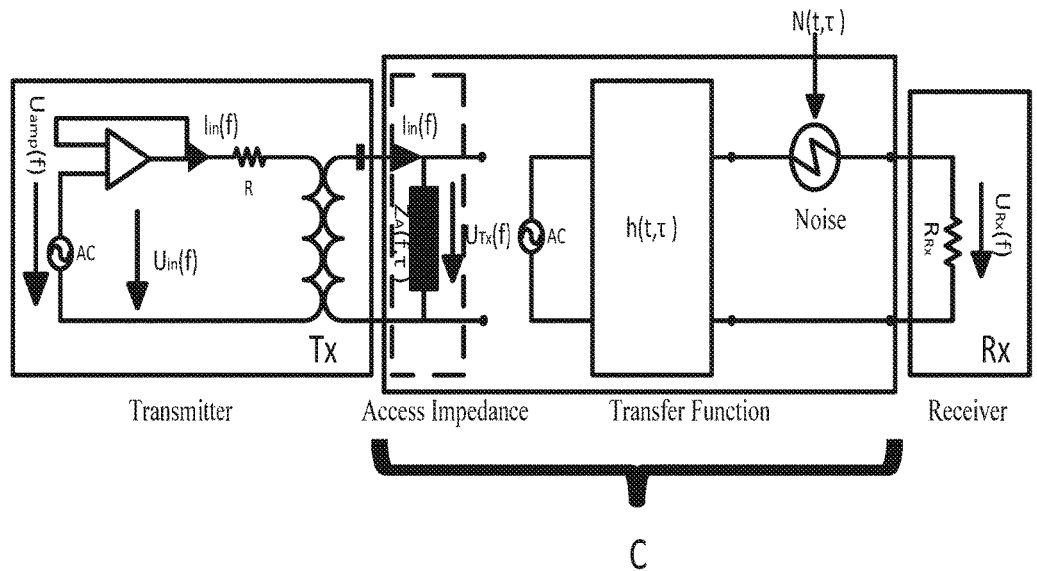
FIG. 1 shows an example of a transmission model with a typical transmitter design, a linear time-variant channel model and an input resistance of the receiver.

In general, the characterisation can be described in terms of the access impedance, the transmission function and the noise. FIG. 1 shows in this respect a complete model of a (PLC) transmission system. Here, the transmitter TX, and the coupling thereof, is shown on the left-hand side. Further, the model transmission channel is shown in the centre next to the temporally varying and frequency-dependent access impedance and noise source. As a rule, the access impedance $Z_A(f,\tau)$ is complex and has a temporally variable behaviour. Therefore, the access impedance cannot be assumed to be constant. The signal to be transmitted is influenced by the time-dependent transmission function $h(t,\tau)$. The signal thus changed is moreover exposed to interfering influences which are shown as additional interference components. These noise components $n(t,\tau)$ may be of different natures. On the right-hand side, the receiver RX is subsequently shown.

So far, only the effect of the noise function $n(t,\tau)$ and of the transfer function have been investigated, whereas the effect of the access impedance has not been taken into consideration.

Figure 2:
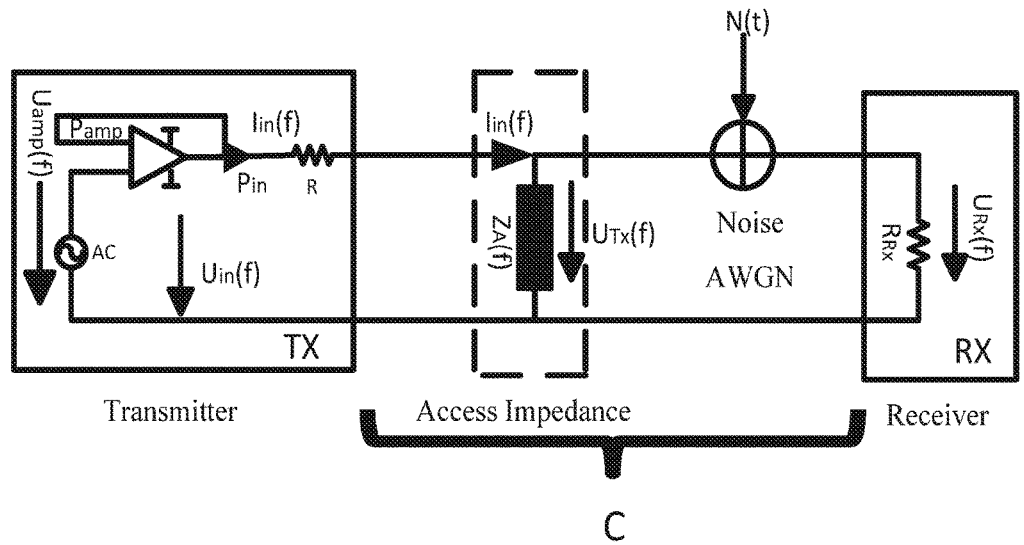
FIG. 2 shows a simplified equivalent transmission model for the calculations.

In order to be able to better represent the effect of the access impedance, the access impedance is, as shown in FIG. 2, separated from the other parts of the transmission channel model. In doing so, the transmission function $h(t,\tau)$ and the noise are modelled as a channel with Additive White Gaussian Noise (AWGN). For simplification, it can further be assumed with reference to low frequencies that both the capacity of the transmitter and of the transducer can be neglected, so that the access impedance $Z_A(f)$ can be represented in a simplified manner.

By means of the method according to the invention or the system according to the invention, it is now possible to provide an optimisation with reference to the transmission and the power used therefor.

In the method or the system according to the invention for an optimised transmission of data in a wired multi-carrier modulation (MCM) transmission system from a transmitter or the transmission unit TX to one or more receivers $RX_1$, $RX_2$, ... $RX_n$ via a transmission channel C, it is initially assumed that the transmitter or the transmission unit TX is only provided with one specified supply power $P_{max}$. On the one hand this may be specified in a normative manner, e.g. by a specification such as EN 50065-1, or simply be dictated by the performance ability of the respective energy supplies. EN 50065-1 standardises e.g. the output voltage. In the case of a higher coupling impedance, also the power is thus limited. In the case of a low coupling impedance, if the standardised voltage is used, this exceeds the available power of the transmitter by far.

A transmitted signal S for transmitting data will then have a plurality m of subcarriers $T_1, T_2, \ldots T_m$, wherein m>=2, as a rule even m>>2.

The data is distributed together with redundant information to the plurality of subcarriers $T_1, T_2, \ldots T_m$ in such a way that the receiver RX can dispense with some of the subcarriers on order to determine the data.

Figure 4:
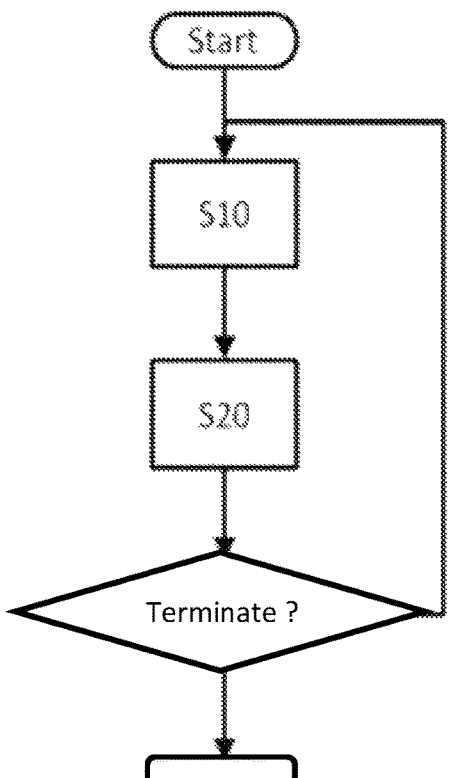
FIG. 4 shows an example of a flowchart according to various embodiments of the invention.

As shown by way of example in FIG. 4, in a first step S10, in at least two or more places $f_1, f_2, \ldots f_l$ in the used frequency spectrum of the subcarriers $T_1, T_2, \ldots T_m$, in each case one frequency-dependent access impedance $Z_1$, $Z_2, \ldots Z_l$ of the wired transmission channel C is determined on the side of the transmitter or of the transmission unit TX. It has to be noted that such a determination does not need to be congruent with the frequencies of the subcarriers, i.e. the access impedance may be present in more places than subcarriers are present, or vice versa, may be determined also in fewer places than subcarriers are present. In an advantageous embodiment of the invention, the access impedance is also determined on at least some frequencies of the subcarriers. For example, this step is carried out by a measurement unit ME. This step may for example also be implemented as a "normal transmission" in FIG. 5.

Figure 3:
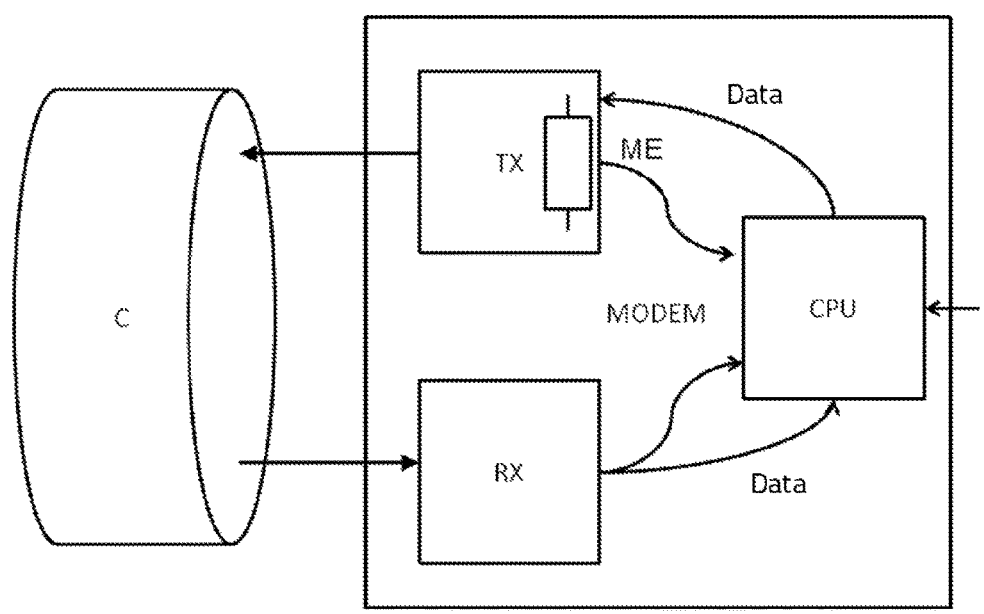
FIG. 3 shows an example of a modem containing the elements of the invention.

In a further step S20, the signal amplitude $A_1, A_2, \ldots A_m$ of the individual subcarriers $T_1, T_2, \ldots T_m$ is adjusted on the basis of the measured frequency-dependent access impedances $Z_1, Z_2, \ldots Z_l$ and the specified supply power $P_{max}$. This step may for example be implemented as an "optimised method" in FIG. 5. This may be carried out for example by a control unit CPU, as shown in FIG. 3. For example, such a control unit may be a suitably programmed digital signal processor, a microprocessor, an ASIC or an FPGA, however without being limited thereto.

With such a method or the associated system made up of a transmitter TX and a receiver RX, an optimised transmission of data both from an energy point of view and from a channel efficiency point of view may be achieved. This case is shown on the right-hand side of FIG. 5 with reference to the optimised transmission of data of a transmitter TX to a receiver RX via a channel by means of a plurality of subcarriers. It is shown here that an improved signal to noise ratio (SNR) may be achieved.

In an advantageous embodiment of the invention, the frequency-dependent access impedances $Z_1, Z_2, \ldots Z_l$ may be determined by measuring a current or a voltage drop over part of the components for one or more subcarriers $T_1, T_2, \ldots T_m$ in the transmitter, which are located in the transmitter or the transmission unit TX. For example, as shown in FIG. 3, the transmitter or the transmission unit TX of a modem may carry out a measurement on a measuring resistor, shown in FIG. 3, representative of a measurement unit ME, and can subsequently be supplied for processing, e.g. by a processor CPU. As a result, the complexity of the system may be reduced. For example, in the case of a transmission of data, the frequency-dependent access impedance $Z_1, Z_2, \ldots Z_l$ may be directly determined for a further temporally subsequent transmission of further data. This means, in a first transmission step S10, data is transmitted and at the same time a measurement is carried out, which can then be used in a step S20 for adjusting a subsequent further data transmission step (again) S10.

For example, in a modem as shown in FIG. 3, at least one transmission unit TX and one reception unit RX are integrated. Thus, for example, if the transmission unit TX of the modem is currently transmitting, the reception unit RX, which is normally inactive during that time, of the same modem can be used for measuring the access impedance of the basis of the signal just transmitted. Typically, the transmission unit TX as well as the reception unit RX will then be unified in a common unit, a so-called transceiver (transmitter-receiver). As a result, no specific measurement unit ME is needed, so that the complexity of the transmission unit TX is reduced.

In as far as with reference to step S20 above an adjustment of the amplitude can be carried out, this adjustment of an individual signal amplitude $A_1, A_2, \ldots A_m$ may also be an adjustment in the sense that a lower signal amplitude than in a neighbouring subcarrier is adjusted or that the signal amplitude is adjusted to 0, i.e. that no signal amplitude at all is provided at the output of the transmitter or the transmission unit TX. For example, no signal amplitude is provided on at least one subcarrier having a low frequency-dependent access impedance. This case is shown on the right-hand side of FIG. 5 with reference to the optimised transmission of data of a transmitter TX to a receiver RX via a channel by means of a plurality of subcarriers. It is shown here that individual subcarriers, on which for example the power would be so low that the power would be lower than the power of the interfering components, are not provided with a signal, instead the power is distributed to other subcarriers, so that an improved signal to noise ratio (SNR) can be achieved.

In a particularly advantageous manner, the invention can be used in an Orthogonal Frequency Division Multiplexer (OFDM) system because these can be adjusted independently of each other due to the orthogonality of the subcarriers $T_1, T_2, \ldots T_m$.

The adjustment of the signal amplitudes $A_1, A_2, \ldots A_m$ of the subcarriers may here be designed differently. Subsequently, at least one possibility is provided, in which other solutions can be directly derived by a person skilled in the art.

For example, the signal amplitudes $A_1, A_2, \ldots A_m$ of the individual subcarriers can be adjusted in such a way that either at the input of the transmission channel, the sum of the voltages of the individual subcarriers becomes maximal or the information transmitted to the receiver becomes maximal. This means that, by selecting the corresponding method, the focus can be placed more on the channel capacity or more on the energy optimisation or, in (weighted) mixed forms, on an optimisation of both target variables.

Further, the method according to the invention or the system according to the invention also allows, apart from the frequency-dependent access impedance $Z_A(f)$ or $Z_A(f,\tau)$ or $Z_1, Z_2, \ldots Z_l$, in addition the temporal change to the access impedance $Z_A(f,\tau)$ or $Z_1(\tau), T_2(\tau), \ldots (Z_1(\tau))$, which is synchronous with the network frequency $f_{net}$, for adjusting the signal amplitudes $A_1, A_2, \ldots A_m$ of the subcarriers $T_1, T_2, \ldots T_m$.

The system and method introduced are suitable in particular for a system in the low frequency ranges, in particular for a system that uses subcarriers with frequencies from the range below 525 kHz.

In particular, the system introduced is a power line communication system.

The invention introduced is particularly suitable for systems wherein the limiting of the supply power is realised by limiting the current in the transmitter.

As a result of the system, in particular applications from the area of SmartMeter, SmartGrid or a SmartHome system are improved, because these can be operated only with a high channel efficiency and at the same time with a high energy efficiency. Further, the invention can also be used in an industrial automation system or in data transmission systems from the pipeline sector.

The introduced method or the introduced system is no longer used to reduce, as before, the overall power of the transmitter, but rather one or more subcarriers are acted upon in a targeted manner, so that the energy efficiency can be ensured whilst at the same time utilising the channel capacity. This may be achieved in particular by means of the fact that one or more subcarriers are reduced in their amplitudes or are even switched off altogether.

The introduced method and the introduced system may carry out the adaptation in an autonomous manner, i.e. without any communication with the counterpart station. As an alternative, the introduced method and the introduced system may also be used in systems in which the respective counterpart stations initially negotiate communication parameters or renegotiate them after certain events. To this end, an intermediate step may be provided e.g. between steps S10 and S20, in which the involved counterpart stations negotiate the communication parameters, e.g. the subcarriers used and/or the used amplitudes of the subcarriers.

Although the present invention has been described with reference to preferred embodiments, workers skilled in the art will recognize that changes may be made in form and detail without departing from the spirit and scope of the invention.

The invention claimed is:

1. A method for transmitting data in a wired Multi-Carrier Modulation (MCM) transmission system from a transmission unit to one or more receivers via a wired transmission channel, wherein only one specified supply power is provided for the transmitter, a transmitted signal for transmitting data has a plurality of subcarriers, and the data together with redundant information is distributed to the plurality of subcarriers in such a way that the receiver can dispense with some of the subcarriers in order to determine the data, the method comprising steps of:
    measuring frequency-dependent access impedances of the wired transmission channel to the transmitter; and adjusting a signal amplitude of each of the subcarriers on the basis of the frequency-dependent access impedances and the specified supply power.

2. The method as claimed in claim 1, wherein measuring the frequency-dependent access impedances includes measuring a current or a voltage drop over part of the components located in the transmission unit for one or more subcarriers in the transmitter.

3. The method as claimed in claim 1, wherein adjusting a signal amplitude of each of the subcarriers includes adjusting the signal amplitude of at least one subcarrier having a low frequency-dependent access impedance to zero.

4. The method as claimed in claim 1, wherein the MCM transmission system is an Orthogonal Frequency Division Multiplexer (OFDM).

5. The method as claimed in claim 1, wherein adjusting a signal amplitude of each of the subcarriers comprises adjusting the signal amplitude of the subcarriers such that either on an input of the transmission channel a sum of voltages of the individual subcarriers becomes maximal or the redundant information transmitted to the receiver becomes maximal.

6. The method as claimed in 1, wherein adjusting a signal amplitude of each of the subcarriers comprises adjusting the signal amplitude of each of the subcarriers based on a temporal change to the access impedance, which is synchronous with a network frequency.

7. A system for optimised transmission of data in a wired Multi-Carrier Modulation (MCM) transmission system from a transmitter to one or more receivers via a transmission channel, comprising:
   a transmission unit configured to transmit a signal for the transmission of data, wherein only one specified supply power is provided for the transmitter, the transmitted signal has a plurality of subcarriers, the data together with redundant information is distributed to the plurality of subcarriers such that the one or more receivers can dispense with some of the subcarriers in order to determine the data;
   a measurement unit configured to measure frequency-dependent access impedances of the wired MCM transmission system on the transmission unit; and
   a control unit configured to adjust the signal amplitude of each of the subcarriers on the basis of the measured frequency-dependent access impedances and the specified supply power.

8. The system as claimed in claim 7, wherein the measurement unit is configured to measure the frequency-dependent access impedances by measuring a current or a voltage drop over part of components located in the transmission unit for one or more of the subcarriers.

9. The system as claimed in claim 7, wherein the control unit adjusts the signal amplitude of at least one of the subcarriers having a low frequency-dependent access impedance to zero.

10. The system as claimed in claim 7, wherein the MCM transmission system is an Orthogonal Frequency Division Multiplex (OFDM) system.

11. The system as claimed in claim 7, wherein a controller is configured to adjust the signal amplitudes of the subcarriers such that either on an input of the transmission channel the sum of voltages of each of the subcarriers becomes maximal or the redundant information transmitted to the receiver becomes maximal.

12. The system as claimed in claim 7, wherein the control unit is configured to adjust the signal amplitude of each of the subcarriers based on a temporal change to the access impedance, which is synchronous with a network frequency.

13. The system as claimed in claim 7, wherein the system uses subcarriers from the range below 525 kHz.

14. The system as claimed in claim 7, wherein the system is a power line communication system.

15. The system as claimed in claim 7, wherein the transmission unit is a component of a transmission/reception unit (transceiver) and the measurement unit is integrated in the reception unit of the system.

16. The system as claimed in claim 7, wherein the specified supply power is provided by limiting a current in the transmitter.

17. A system for optimised transmission of data in a wired Multi-Carrier Modulation (MCM) transmission system from a transmitter to one or more receivers via a transmission channel, comprising:
   a transmission unit configured to transmit a signal for the transmission of data, wherein only one specified supply power is provided for the transmitter, the transmitted signal has a plurality of subcarriers, the data together with redundant information is distributed to the plurality of subcarriers such that the one or more receivers can dispense with some of the subcarriers in order to determine the data;
   a measurement unit configured to measure frequency-dependent access impedances of the wired MCM transmission system on the transmission unit; and
   a control unit configured to adjust the signal amplitude of each of the subcarriers on the basis of the measured frequency-dependent access impedances and the specified supply power;
   wherein:
      the measurement unit is configured to measure the frequency-dependent access impedances by measuring a current or a voltage drop over part of the components located in the transmission unit for one or more of the subcarriers;
      the control unit adjusts the signal amplitude of at least one of the subcarriers having a low frequency-dependent access impedance to zero;
      the MCM transmission system is an Orthogonal Frequency Division Multiplex (OFDM) system;
      the controller is configured to adjust the signal amplitudes of the subcarriers such that either on an input of the transmission channel the sum of voltages of each of the subcarriers becomes maximal or the redundant information transmitted to the receiver becomes maximal;
      the control unit is configured to adjust the signal amplitude of each of the subcarriers based on a temporal change to the access impedance, which is synchronous with a network frequency; and
      the system uses subcarriers from the range below 525 kHz.

* * * * *